United States Patent [19]

Levanon

[11] Patent Number: 4,769,764
[45] Date of Patent: Sep. 6, 1988

[54] MODULAR COMPUTER SYSTEM WITH PORTABLE TRAVEL UNIT

[76] Inventor: Isaac Levanon, 78 Oak Cliff Rd., Newton, Mass. 02160

[21] Appl. No.: 895,057

[22] Filed: Aug. 11, 1986

[51] Int. Cl.⁴ ............................................. G06F 9/00
[52] U.S. Cl. .................................................... 364/708
[58] Field of Search ........ 364/708, 709, 900 MS File, 364/; 312/208; 361/413, 390, 391; D14/100, 114, 115

[56] References Cited

U.S. PATENT DOCUMENTS

| D. 274,907 | 7/1984 | Reese | D14/100 |
|---|---|---|---|
| 4,216,522 | 8/1980 | Slagel et al. | 361/392 |
| 4,294,496 | 10/1981 | Murez | 312/208 |
| 4,323,979 | 4/1982 | Johnston | 364/708 |
| 4,333,155 | 6/1982 | Johnston | 364/708 |
| 4,479,198 | 10/1984 | Romano et al. | 364/900 |
| 4,496,200 | 1/1985 | Hagstrom et al. | 312/208 |
| 4,496,943 | 1/1985 | Greenblatt | 340/711 |
| 4,497,036 | 1/1985 | Dunn | 364/708 |
| 4,530,066 | 7/1985 | Ohwaki et al. | 364/708 |
| 4,564,751 | 1/1986 | Alley et al. | 364/708 X |
| 4,617,640 | 10/1986 | Kishi et al. | 364/708 |
| 4,669,053 | 5/1987 | Krenz | 364/708 |
| 4,680,674 | 7/1987 | Moore | 364/708 X |

FOREIGN PATENT DOCUMENTS

| 60-160418 | 8/1985 | Japan | 364/708 |
|---|---|---|---|
| 60-214030 | 10/1985 | Japan | 364/708 |

OTHER PUBLICATIONS

IBM Technical Disclosure Bulletin, vol. 28, No. 5, Oct., 1985, "Computer Stand".
Byte, 1985 Nov., pp. 352–353.

Primary Examiner—Gary V. Harkcom
Assistant Examiner—Tan V. Mai
Attorney, Agent, or Firm—David Pressman

[57] ABSTRACT

A computer system comprises a generally U-shaped base unit (10) and a generally-rectangular travel unit (12) which mates with the base unit, between the legs (34, 36) of the "U". The portable unit contains a complete computer system, including a flip-up monitor screen (14), a disc drive (20), and a detachable keyboard (24). The mating base unit includes expansion slots (30) for additional memory, peripheral equipment controllers, a CRT controller, etc. Also the base unit includes a controller (112) for one or more additional disc drives (26, 28). The facing sides of the legs of the U-shaped base unit have a step-shaped configuration (42, 44, 46) and the portable unit fits onto the step. The bight portion (38) of the base unit has a front connector (49A) for mating with the portable unit and rear connectors (48, 58A) for connection of additional equipment, such as a printer and modem.

20 Claims, 6 Drawing Sheets

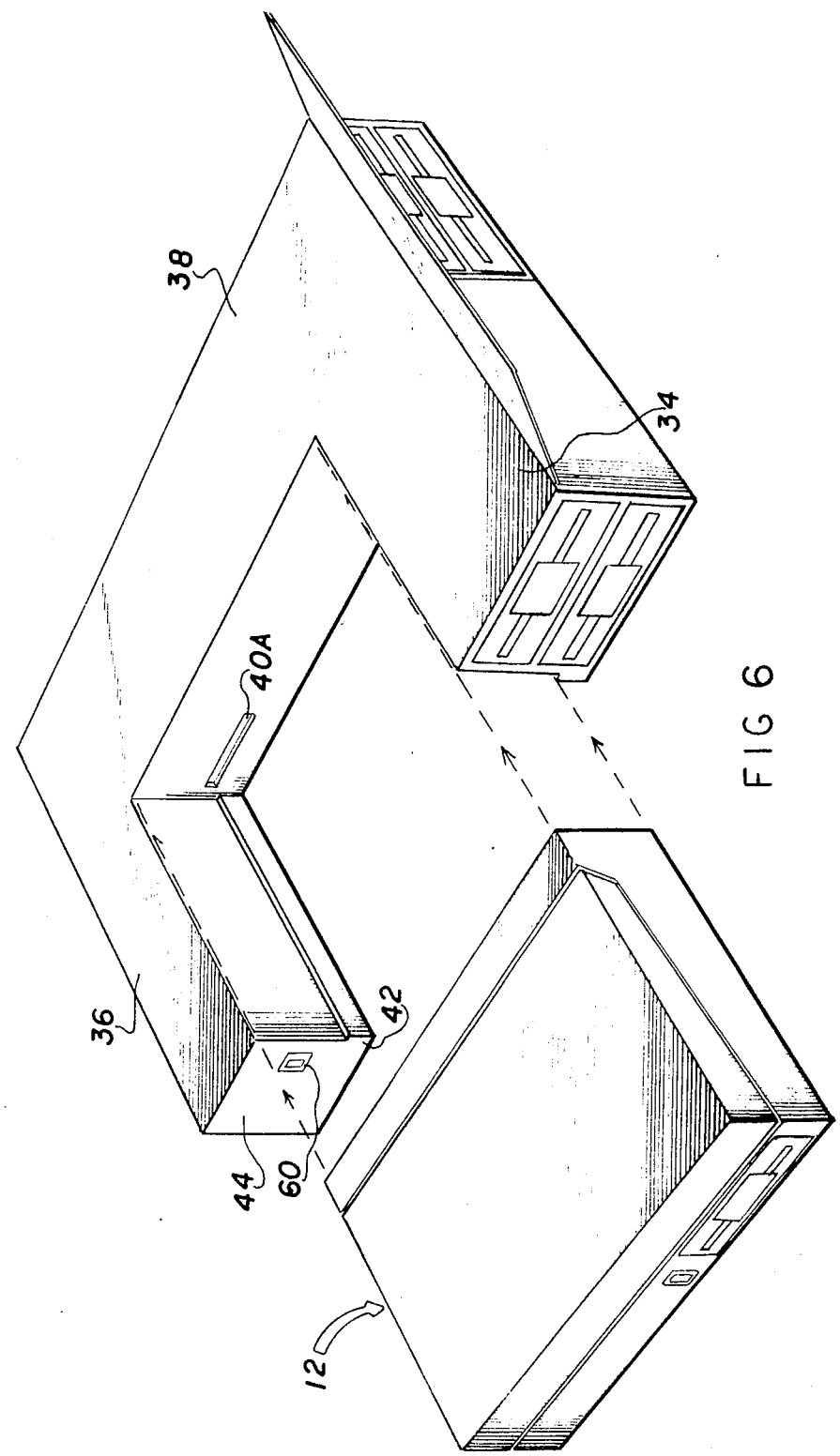

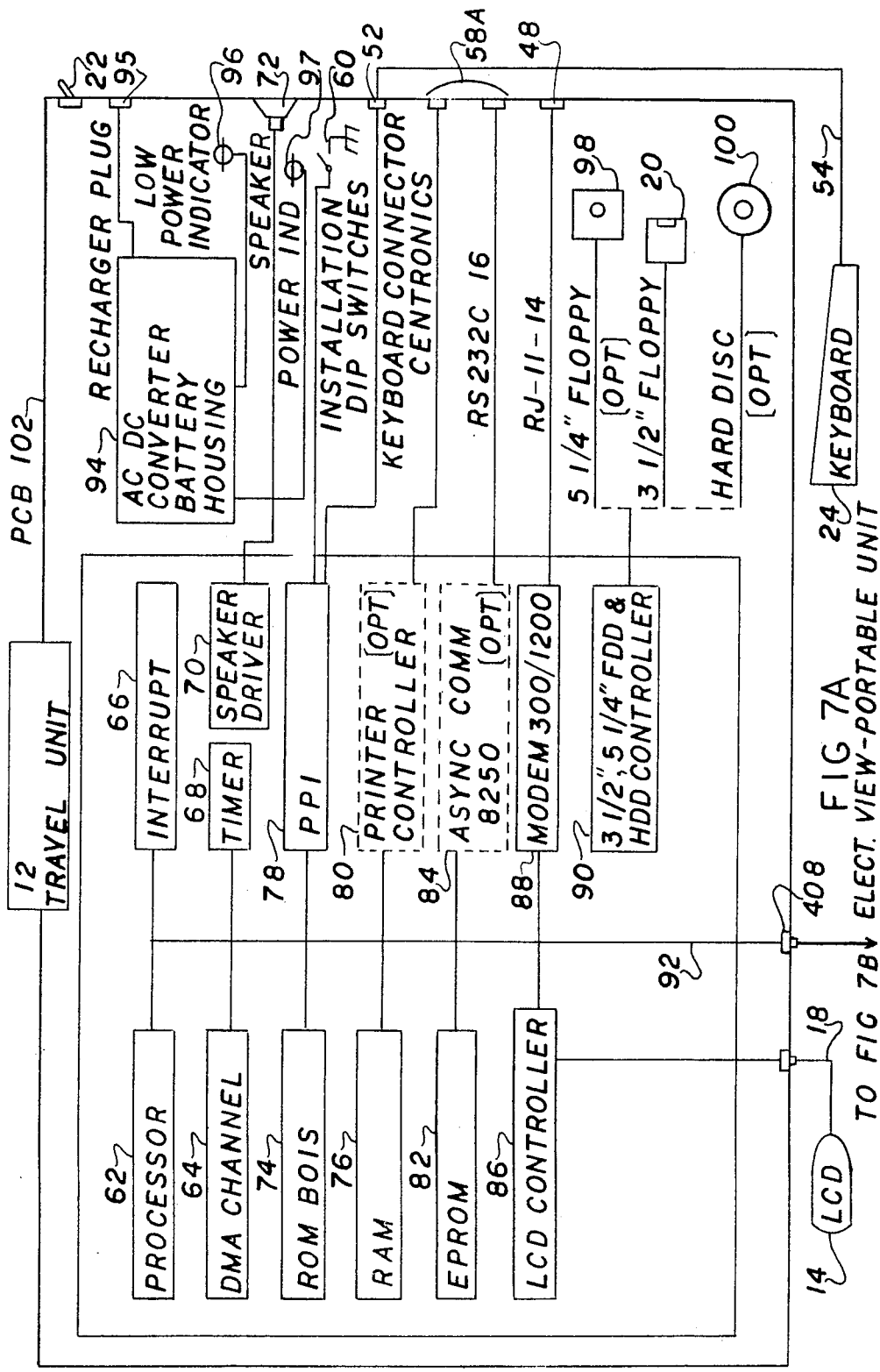
FIG. 7A ELECT. VIEW-PORTABLE UNIT

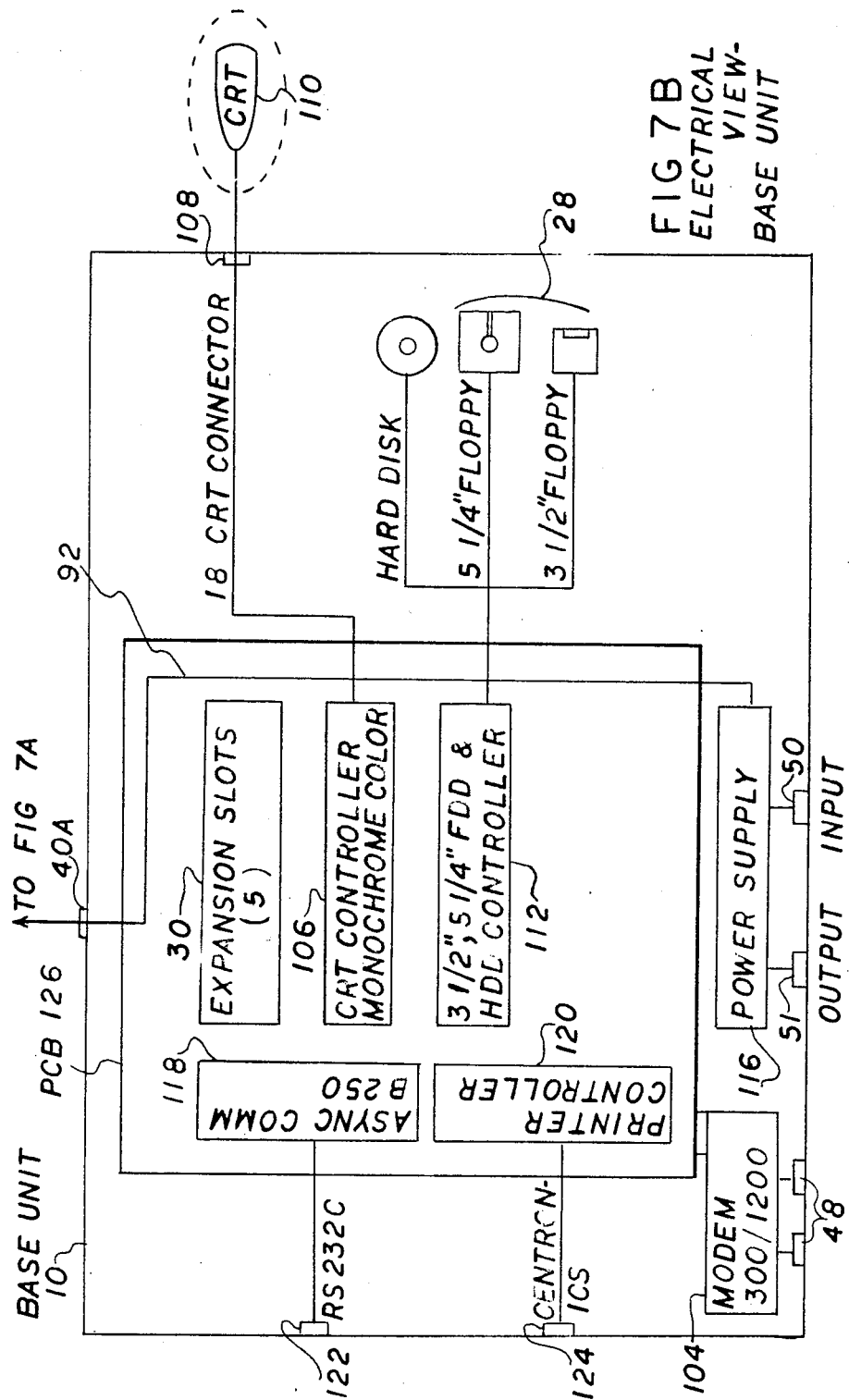

MODULAR COMPUTER SYSTEM WITH PORTABLE TRAVEL UNIT

BACKGROUND—FIELD OF INVENTION

This invention relates to computers, particularly to a computer system having modular components, including a portable unit (for use when travelling) and a mating base expansion unit (for use in the office).

BACKGROUND—DESCRIPTION OF PRIOR ART

Popular computers for home and small-business use are usually termed micro-computers. Originally, and most popularly, such computers were desktop units consisting of the following components: a central processing unit (CPU), a display screen or monitor (usually a cathode-ray tube [CRT]), one or two disc drives, and a keyboard. The various components were usually provided in one or more interconnected components or boxes, e.g., with the CPU and disc drives in one box, the CRT in a second box, and the keyboard in a third box; or the CRT, CPU, and disc drives in one box and the keyboard in another box; or the CRT and CPU in one box, the disc drives in a second box, and the keyboard in a third box.

While such units worked well, they were large, bulky, heavy, and awkward; thus moving them from one place to another was difficult and portable use was out of the question. I.e., they did not complement the work habits of business people, who travel frequently.

In an attempt to remedy the above problems, several manufacturers have brought out so called "portable" computers. These comprised a suitcase-like enclosure which contained all of the components (CPU, CRT, disc drives, and keyboard) of a computer. While termed "portable" computers, these units were, in reality, difficult to transport readily because their size and bulk (about 25 to 35 liters and 9 to 14 kg) were too great for carrying, except by the most hardy individuals, and too great for ease of portable use, in, e.g., airplanes and other forms of transportation. They were especially too large to fit under an airplane's seat. In addition they required relatively high power and high voltage to operate, thus necessitating that they be used near an electrical wall outlet.

While some portable computers were battery powered, their use has thus far been very limited because they had a relatively small memory, little or no capability for expansion, little or no capability for addition of bulk storage units, such as hard-disc drives, etc. Also they were heavy and bulky and were usually incompatible with regular office computers. Thus upon a return to the office, the user was faced with great difficulties in transferring data and programs to whatever larger computers such user's office had in use.

OBJECTS AND ADVANTAGES

Accordingly, several objects and advantages of the invention are to provide a new and improved computer, to provide a portable computer which is readily compatible with office machines and which can be used and expanded at the office, to provide a computer system which can readily fulfill a travelling businessperson's needs, to provide a portable computer which is light in weight, compact, and useable without access to wall outlets. Other objects and advantages are to provide a new modular computer design which is highly functional and useful, efficient in the use of space, and has a high degree of ergonomic (human engineered) compatability. Further objects and advantages will become apparent from a consideration of the ensuing description and accompanying drawings.

DRAWING FIGURES

FIG. 6 is a front perspective view of the system with the screen and keyboard closed showing how the portable unit mates with the base unit.

FIGS. 7A and 7B are block diagrams of the electronic systems of the portable and base units, respectively.

DRAWING REFERENCE NUMERALS

| | | | |
|---|---|---|---|
| 10 | base unit | 11 | space |
| 12 | portable unit | 14 | monitor (flat display) |
| 16 | screen | 18 | flat cable |
| 20 | disc drive | 22 | power switch |
| 24 | keyboard | 26 | front disc drive |
| 28 | side disc drives | 30 | expansion slots |
| 32 | cover | 34 | right arm |
| 36 | left arm | 38 | bight portion |
| 40 | connector | 42 | base portion of 36 |
| 44 | top portion of 36 | 46 | ledge |
| 48 | modem jack | 50 | AC power input |
| 51 | AC power output (for CRT) | 52 | DIN connector |
| 54 | cable | 55 | groove |
| 58 | rear connectors | 60 | switch |
| 62 | central processing unit | 64 | DMA channel |
| 66 | interrupt unit | 68 | timer |
| 70 | speaker driver | 72 | speaker |
| 74 | ROM | 76 | RAM |
| 78 | Parallel Port Interface | 80 | printer controller |
| 82 | EPROM | 84 | asynchronous comm unit |
| 86 | LCD controller | 88 | modem |
| 90 | controller | 92 | system buss |
| 94 | battery and charger | 95 | recharger plug |
| 96 | low-batt. ind. | 97 | power on indicator |
| 98 | disc drive port | 100 | hard disc drive port |
| 102 | PCB | 104 | modem |
| 106 | CRT controller | 108 | CRT port |
| 110 | optional CRT | 112 | disc drive controller |
| 114 | disc drive ports | 116 | power supply |
| 118 | asych. comm. unit | 120 | printer controller |
| 122 | connector | 124 | connector |

DESCRIPTION—FIG. 1—COMPUTER ARRANGED FOR OFFICE USE

Figure 1:
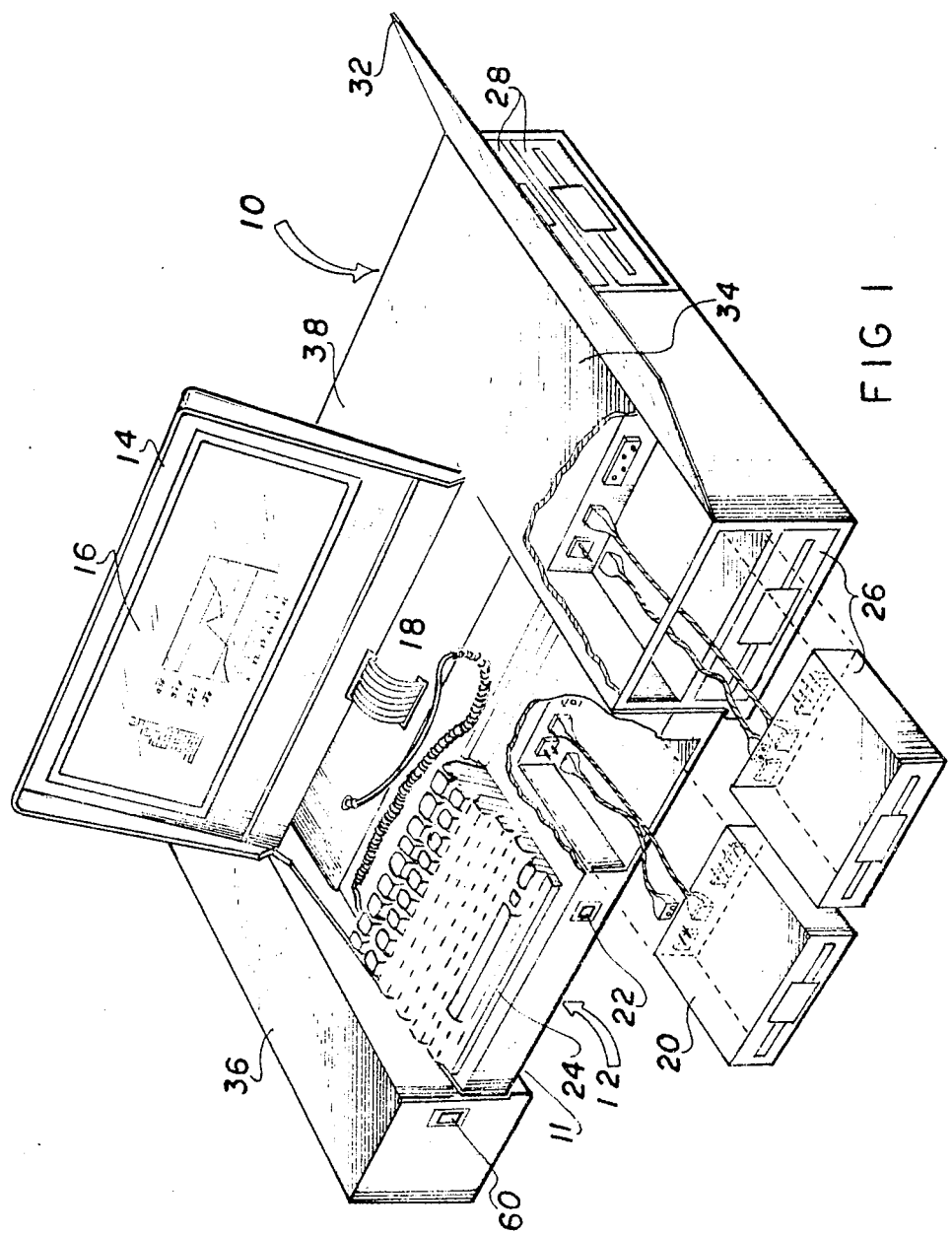
FIG. 1 is a front perspective view (partially exploded, partially cut away) of a modular computer system according to the invention with a flat-screen display in open condition.

FIG. 1 is a perspective view taken from the front right side of the computer of the invention, arranged for office use. It comprises a U-shaped base unit 10 and a mating portable or travel unit 12. Travel unit 12 is plugged into base unit 10 so that the base unit expands and enhances the capabilities of the travel unit.

Travel unit 12 has a fold-up viewing screen or monitor 14 which has an LCD or other type of flat display screen 16. Screen 16 may have 25 lines of 80 characters each and detent latches (not shown) to hold it in either its closed or upright position. Monitor 14 is electrically connected to unit 12 by a flat cable 18. For semi-permanent storage, unit 12 has a removable disc drive unit 20, preferably of the type that uses a 3.5" (9 cm) floppy disc (preferably 700 kilobytes) or a hard (Winchester) disc (20 megabytes minimum) and a power switch 22 on its front. Unit 12 also has its own power supply in the form of a battery pack (now shown, but under keyboard 24), together with an electronic computer system (not shown, but behind disc drive 20 and the battery pack) consisting of a CPU (central processing unit), RAM (Read-And-write Memory) chips for temporary working storage, ROM (Read-Only Memory) chips for permanently storing system programs (DOS and BASIC), I/O (Input/Output equipment) controllers, and other components, to be discussed later. Lastly, unit 12 has a detachable keyboard 24 which is positioned on the deck (FIG. 5) of unit 12.

Base unit 10 has two disc drives 26 facing and accessible from the front (one is shown removed) and optional additional disc drives 28 on its right side. Preferably one of drives 26 may be a hard (Winchester) disc drive for high (multi-megabyte) storage capacity. Optional side disc drives are accessed by a fold-down cover 32 which snaps in closed position or is held by screw fasteners. Unit 20 also has its own electronic components (not shown, but in left arm 36 and bight portion 38) consisting of an AC-to-DC converter (power supply), expansion slots, and appropriate ports for a CRT monitor, additional hard- and soft-disc drives, etc., to be discussed later. Base unit 10 also has an on-off switch 60.

When portable unit 12 is mated with base unit 10, a narrow space 11 will exist under the portable unit, but otherwise the mated units will have a rectangular compact configuration when the monitor is folded down or closed.

As a brief introduction to its use and advantages, portable unit 12 can be removed from base unit 10 and carried about as needed and used wherever desired due to its own internal power supply, preferably a rechargeable battery pack. Since it has its own disc drive 20, it can be used to run any program desired. It can be conveniently carried by a (not shown but which can be a pull-out handle mounted on the front under the keyboard or underneath and arranged to swing up front) and when in use, screen 16 is unfolded to the position shown in FIG. 1 so that it can be used on one's lap in an airplane, or on a desk in a hotel or branch office, etc.

DESCRIPTION—FIG. 2—REAR VIEW WITH PORTABLE UNIT PARTIALLY SEPARATED

Figure 2:
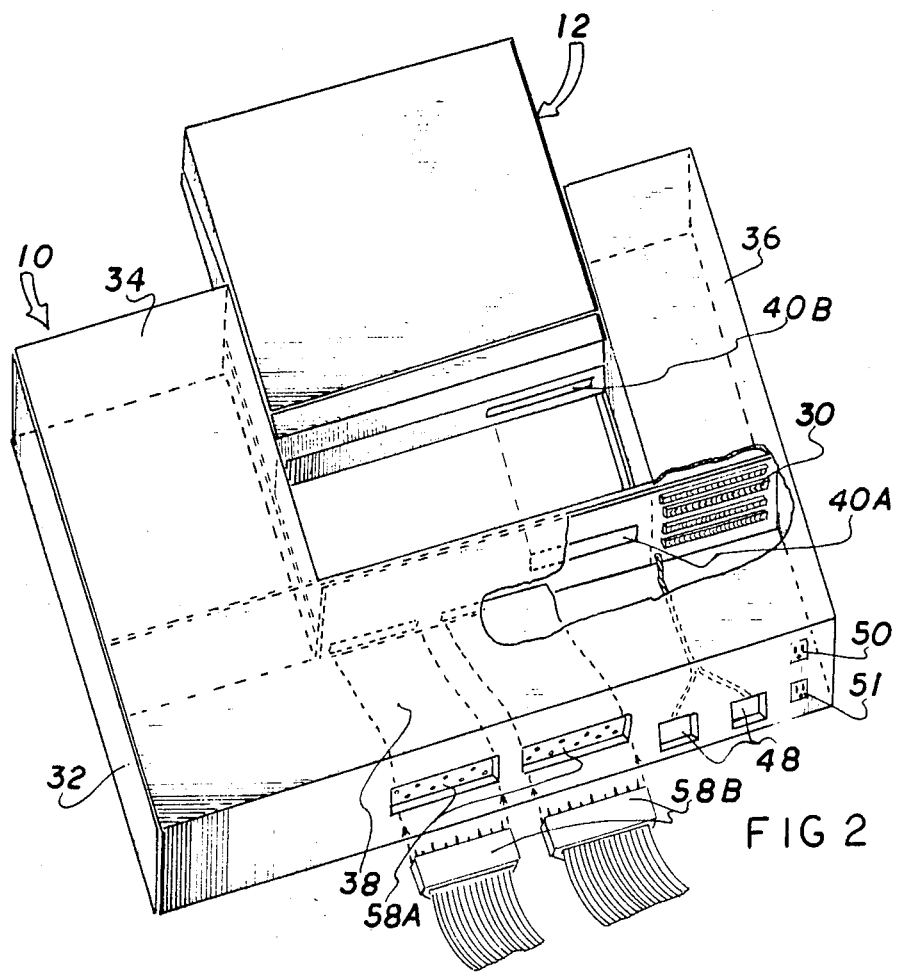
FIG. 2 is a rear perspective view of the system (partially cut away) with its portable unit partially removed, and its flat-screen display closed.

The computer system is shown in FIG. 2 with portable unit 12 partially removed from base unit 10. As indicated, unit 10 has a U-shaped configuration and consists of a right arm 34 (seen from the front), a left arm 36, and a bight or joiner section 38 which interconnects the rear ends of the two arms and contains one-half 40A of a connector for electrically connecting base unit 10 to a mating connector 40B on portable unit 12.

Inside base unit 10 is a set of expansion slots 30. Printed circuit cards (not shown) can be plugged into these slots to provide various expansion functions known in the art, such as a modem, color controller, etc. These slots are accessed by removing the back panel of bight portion 38.

At the rear of base unit 10 are a pair of female connectors 58A for supplying serial and parallel outputs. Into connectors 58A are plugged a pair of mating male connectors 58B which have cables which lead to a printer (parallel Centronics or equivalent brand) and an asychronous serial communications (RS-232) device, respectively. Additional jacks can be provided for other functions, such as a serial printer, machine input, etc. Another pair of jacks 48 are provided for connection to one or more external modems (1200 and 300 baud), if desired. Lastly, a power input 50 is provided for receiving a power cord (not shown) and an AC power output 51 is provided for supplying AC power to a a peripheral device, such as a CRT or printer.

DESCRIPTION—FIG. 3—REAR VIEW OF SYSTEM

Figure 3:
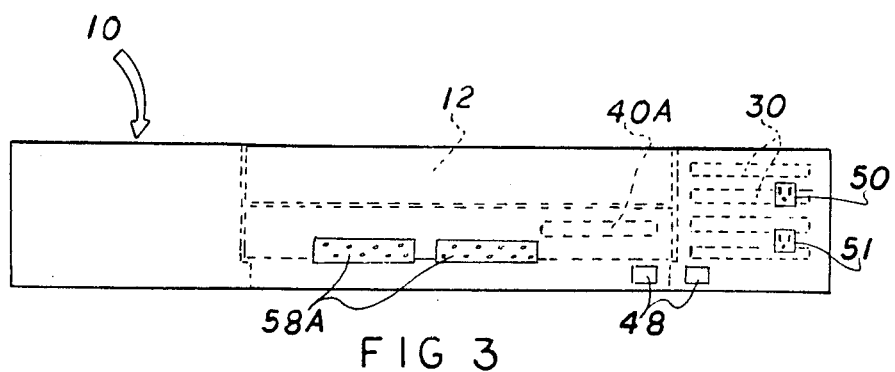
FIG. 3 is a rear elevational view of the base unit showing the locations of the connectors and internal expansion slots.

The position of the portable unit in the base unit, the expansion slots in the base unit, the rear jacks, etc. are shown in the rear, elevational view of FIG. 3. Note that the back of the system is flat and vertical and the entire system assumes a compact, neat, and flat configuration, even when base expansion unit 10 is mated with the travel unit.

DESCRIPTION—FIG. 4—OFFICE CONFIGURATION WITH KEYBOARD DETACHED

Figure 4:
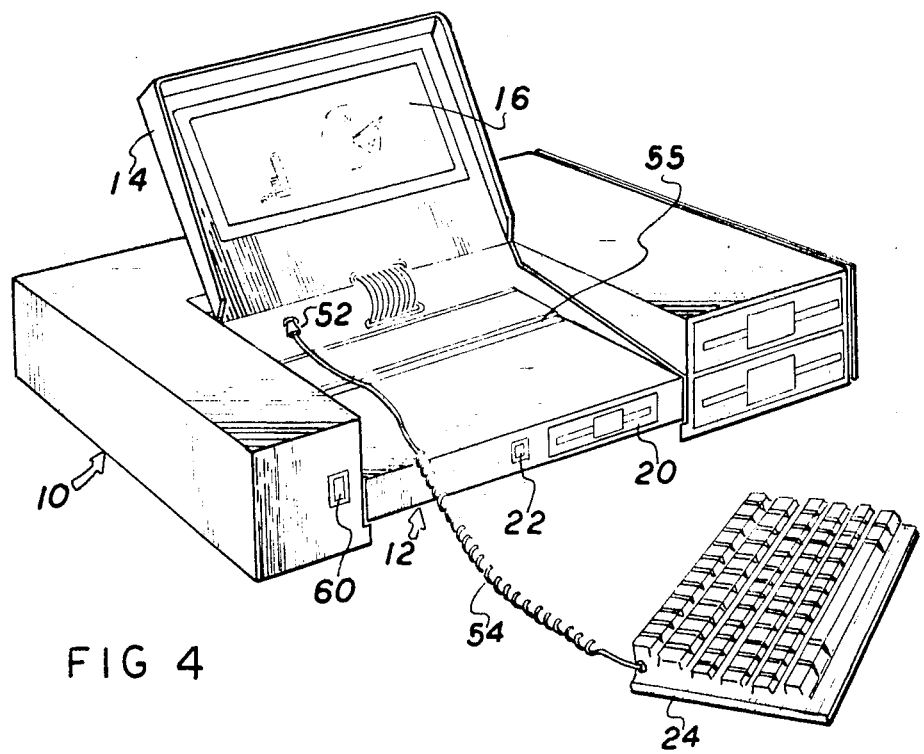
FIG. 4 is a front perspective view of the system with the keyboard detached for use and the flat-screen display open.

The computer is shown in FIG. 4 in working (office or desk) condition. Keyboard 24 is detached for ease of use and monitor 14 is opened for viewing. Keyboard 24 has a full set of conventional computer keys and a coiled keyboard cable 54 which extends from a DIN connector 57 in a vertical rear wall of the portable unit under the monitor's hinge. Cable 54 may alternatively be non-coiled and on an automatic retractor so that it will drawn back into unit 10 when keyboard 24 is replaced to the position shown in FIG. 1, Of course keyboard 24 can be removed from portable unit 12 whether or not it is mated with base unit 10 and keyboard 24 can be used when it is in position on unit 12 as shown in FIG. 1.

The base unit with the portable unit attached can be set back at the rear of a desk or on a table (not shown) and the keyboard can be placed at the front edge of a desk or on a typing table for ease of use. The system in this configuration has maximum capabilities and is the full equivalent of any desk computer.

FIG. 5—PORTABLE UNIT IN USE

Figure 5:
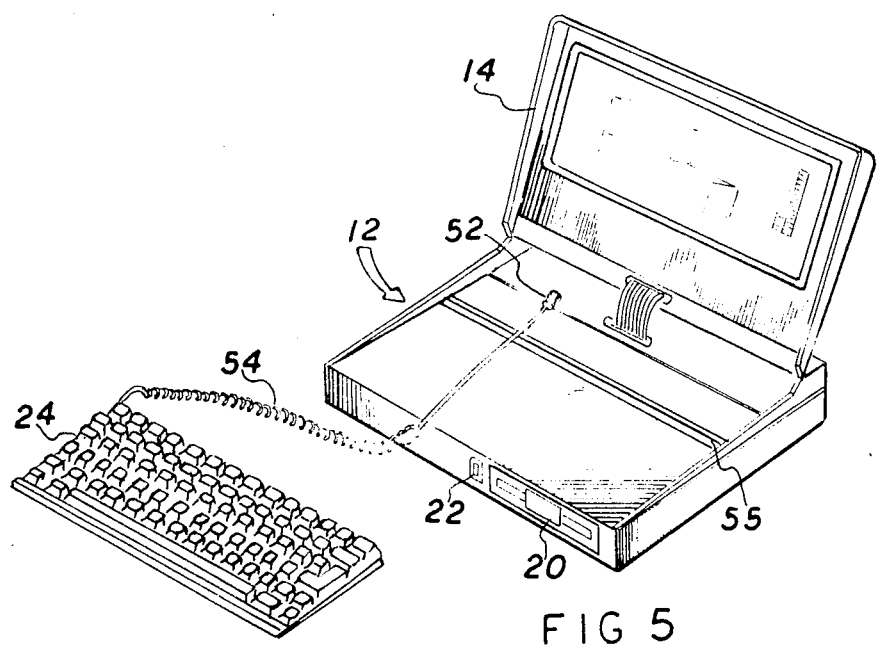
FIG. 5 is a front perspective view of the portable unit with the screen open and the keyboard disconnected.

A view of the portable unit in use with the keyboard detached and the screen open is shown in FIG. 5. Since portable unit 10 is light in weight and compact, and since it has its own power supply, its user can conveniently carry it to business conferences, on trips (domestic and international), and can used it in almost any form of transportation, such as in planes, boats, automobiles, a waiting room, lounge, etc. Thus it is most suitable for travelling personnel, such as salespersons, writers, etc. Due to its compact, loose-leaf book size, it can be stored in any briefcase. Since it is small and has a monitor which consumes low energy, it can use a small battery and thus does not need to be plugged into a wall outlet and can be carried easily, even by weaker individuals.

To use the portable unit, the user need merely open screen 14 as indicated in FIG. 5. If space is relatively tight, as on a plane, keyboard 24 can be left in position as in FIG. 1 and the unit can be used on the lap or on an airplane serving tray. If more room is available, as in an office where a table and desk are available, keyboard 24 can be removed from the rest of portable unit 12 as indicated in FIG. 5 and used close to the user, e.g., on the lap or at the edge of the table closest to the user. Alternatively, any suitable form of wireless communication to the keyboard can be used, such as infrared, ultrasonic, radio waves, etc.

Its size is approximately 6.3 cm thick, 21.5 cm wide, and 28 cm deep and it weighs only about 4 kg. Its keyboard 24 is held in position on the deck of unit 12 by a transverse groove 55 such deck and a mating rib (not shown) on the bottom of the keyboard. When cover 14 is closed, it is held closed by manually-closeable latches or detent latches (not shown), which may be integral with the cover and deck of unit 12. Cover 14, when latched closed, also holds keyboard 24 in position.

FIG. 6—FRONT PERSPECTIVE VIEW WITH SCREEN AND KEYBOARD CLOSED

As shown in FIG. 6, left and right arms 34 and 36 each have a step-shaped configuration when seen from the front. I.e., looking at left arm 36, it has a slightly wider base portion 42 and a narrower top portion 44 positioned to the outside of the base portion so that a step or ledge 46 is on the inside of the "U". Ledge 46 ends at bight portion 38 at the rear of the arm. The front surface of bight portion 38 is vertical and flat, save for connector half 40A.

Portable unit 12 has an rectangular configuration. When the portable unit is mated or docked with the base unit, it fits onto ledges 46 and between top portions 44; its width is slightly less than the spacing between top portions 44 as indicated by the broken assembly lines. When the portable unit is positioned on the base unit in this manner, its connector 40B (FIG. 2) mates with connector 40A on the base unit; ledge 46 assures correct vertical positioning. A pair of snap-in detent latches (not shown) on the inner sides of arms 34 and 36 of the base unit mate with corresponding latches (not shown) on the sides of the portable unit to assist in holding the two units securely together; when the portable unit is to be removed, it is pulled out with sufficient force to break the hold of the latches.

DESCRIPTION—FIGS. 7A AND 7B—ELECTRONIC BLOCK DIAGRAM

FIGS. 7A and 7B is a block diagram of the electronic components of the computer system. The electronic components within the travel unit are shown in FIG. 7A and those in the base unit are shown in FIG. 7B. First, the components already mentioned will be discussed.

In FIG. 7A, the keyboard and its cable are shown at 24 and 54, respectively, while the LCD display and its cable are shown at 14 and 18, respectively. The connectors which interconnect the portable and base units are shown at 40A (FIG. 7B) and 40B. The power switch on the travel unit is shown at 22, while the rear connectors are shown at 58A.

All of the components of a conventional computer are provided in the travel unit, including a central processing unit 62, a DMA (direct memory access) channel 64, an interrupt unit 66, a timer 68, a speaker driver 70, a speaker or other transducer 72, a ROM 74 (ROM 74 includes the BIOS [Basic Input-Output System] for the computer), a RAM 76 (capable of storing 256 or more kilobytes), a Parallel Port Interface (PPI) 78 (connected to keyboard cable 54 via a DIN connector 52), a printer controller 80 (connected to the printer cable by a Centronics or equivalent brand connector 58A), an Eraseable Programmable ROM (EPROM) 82, an asynchronous communications unit 84 (optional, but preferably a type 8250 chip), an LCD controller 86, a modem 88 (300/1200 baud), and a controller 90 for 3.5" 5.25" floppy disc drives and a hard disc drive. All of these components are joined by a system buss 92 which is also connected to connector 40B for connection to base unit 10. Various other conventional components and interconnections, well known to those skilled in the art, are provided, but are not shown for purposes of clarity and brevity.

Portable unit 12 also includes a battery and charging unit 94 which has its own recharger plug 95 (not shown, but which is preferably on the rear of the device) for recharging and a low battery indicator 96, adjacent plug 95. A power-on indicator 97 can also optionally be provided. LCD controller 86 is also connected to and drives display monitor 14 via cable 18. Disc controller 90 is connected to 3.5" disc drive 20 and also can be connected to 5.25" and hard disc drives via symbolically-illustrated ports 98 and 100 which are not shown on the outside of the portable unit, but which can also be provided on its back surface. Printer controller 80 is connected a printer output terminal (part of connector 58A), and asynchronous communications unit 84 and printer controller 80 are connected to their output terminals, also part of connector 58A.

All of the components just discussed, except for the connectors, indicators, and battery unit, are mounted on a Printed Circuit Board (PCB) 102 which is provided in the bottom of the base unit (FIG. 2), to the rear of disc drive 20. The battery unit is also provided in the bottom, to the left of disc drive 20.

The components in unit 10 serve to expand the capabilities and functions of the portable unit. To this end unit 10 includes up to five expansion slots 30 which are connected to buss 92. These comprise a row of PCB cardedge connectors, e.g. of the type shown in Sochor U.S. Pat. No. 4,275,944 (1981), for receiving optional printed circuit cards (not shown) which can be plugged into the connectors to add various functions to the computer, such as additional memory, i.e., additional RAM capacity, a graphics controller, network controller, an IEEE-488 instrument controller buss, a plotter controller, etc. Also connected to buss 92 is a CRT controller 106 for monochrome or color CRT displays, as indicated. Controller 106 is also connected to a CRT port 108 to which an optional CRT 110 can be connected. As is known, it is desirable to use CRT 110 in lieu of a flat screen LCD monitor 14 in certain applications, e.g., where a full-page display is desired, where higher resolution is desired, etc. Also a disc drive controller 112, similar to controller 90 of travel unit 12, is provided for two additional optional side disc drives 28 (FIG. 1) on the side of the base unit. These may be a 5.25" drive and/or a 3.5" drive as shown, or one may be a hard disc drive, as indicated.

The base unit also contains a power supply 116 which is connected to an AC cord 50 and which converts the alternating current mains power to suitable DC voltages for driving the electronic components of the computer. Power supply 116 preferably is a 220-watt supply or a 100-watt supply which can be expanded by add-on 60-watt expansion modules. Base unit 10 may also contain optional additional units, such as an asynchronous communications unit 118 and a printer controller 120; these units are connected to respective ports or connectors 122 and 124 on the outside of the unit. A modem 104 (300 and 1200 baud) is provided for allowing the computer to communicate over telephone lines; the modem has its own connectors or ports 48. All of the components are mounted on or adjacent a PCB (motherboard) 126.

In the base unit, PCB 126 (which has expansion slots 30 mounted thereon) is provided in left arm 36 (FIG. 2) while power supply 116 is provided in bight portion 38. Alternatively, the power supply can be provided in the left arm, at the front, and the PCB can be provided in the rear of the left arm or in the bight portion.

OPERATION

As discussed, portable unit 12 is a complete computer in itself, so that it can be used for most computing functions, especially by a business traveller. When the user is at home or a branch office, he or she can expand the portable unit by mating it with the base unit, whereupon he or she will enjoy additional internal memory for handling large accounting tasks, large word processing tasks, etc. Also the user will be able to perform additional functions, such as instrument control, control of large printers, networking functions, control of mechanical systems, control of graphics plotters, etc. if the necessary PCB expansion cards have been plugged into the expansion slots. As also indicated, the physical arrangement of the portable and mating base units are highly complimentary so that the complete system is compact and the expanded features are convenient to the user, at the front or sides of the machine.

SUMMARY, RAMIFICATIONS, AND SCOPE

Accordingly, it is seen that, according to the invention, a highly useful, versatile, modular computer system is provided which has the full capabilities of a desktop computer yet which can be used easily in the field or when travelling.

While the above description contains many specificities, these should not be construed as limitations on the scope of the invention, but as exemplifications of the presently-preferred embodiments thereof. Many other ramifications and variations are possible within the teachings of the invention. For example, fewer components than those shown can be provided in the portable unit if additional compactness and less weight is desired. The portable unit can be made to share the base unit's power supply. The base unit can have a built-in full page display monitor, printer, etc. The semi-permanent memories (RAM) on the portable or base units can be bubble memories, semiconductor storage memories, etc. in lieu of disc drives, etc. The base and portable unit's power supplies can be arranged to be interconnected via connectors 40A and 40B such that when the portable unit is plugged into the base unit and the base unit is turned on, the portable unit will also be turned on and will draw its power from the base unit, thereby to conserve its battery. When the base and travel units are connected via connectors 40A and 40B, the base unit's power supply will recharge the travel unit's batteries, even if the base unit is turned off. Thus the scope of the invention should be determined by the appended claims and their legal equivalents, and not by the examples given.

I claim:

1. A computer system comprising:
    a portable computer unit comprising a housing having a substantially flat top, a front, and opposing sides, said housing having a rectangular shape when seen from the top and front, said housing containing a display screen which can fold up from a horizontal position to a vertical position, a central processor, a temporary internal storage memory, a first memory device for data storage, said first memory device being mounted in and accessible from said front side, a data entry device, and an external electrical connector for mating with a base expansion unit, and
    said base expansion unit having two legs interconnected by a bight portion so as to be U-shaped when seen from the top, the spacing between said legs being substantially equal to the width of said portable unit, said base unit having a mating external electrical connector for mating with said external electrical connector on said portable unit,
    said base and portable units each having common busses and being arranged so that when their electrical connectors are mated, their common busses are operatively interconnected so as to form a computer system which is expanded in relation to that of said portable unit,
    said base unit containing a plurality of electrical connectors for receiving a corresponding plurality of electronic expansion cards, said base unit also having a plurality of external electrical connector ports for providing electrical connections to a corresponding plurality of peripheral devices, the free end of one of said legs of said base unit containing a second data memory device, said second memory device being accessible from the axial end of said one leg,
    said base and said portable units containing mechanical mating means for maintaining said units at a substantially common height level when said portable unit is placed between the legs of said base unit and the mating connectors of said units are mated.

2. The computer system of claim 1 wherein each of said two legs of said base unit has an inner surface which faces the opposing leg and which has a step-shaped configuration.

3. The computer system of claim 2 wherein the step on each of said inner surfaces of said legs includes a ledge which faces up and which is parallel to the top surface of said base unit, the spacing between said ledge and the top of said base unit being equal to the height of said portable unit, such that when said portable unit is placed upon said ledge, the top surfaces of said portable and base units are coplanar.

4. The computer system of claim 2 wherein said data entry device of said portable unit is a keyboard, said keyboard being mounted under said display screen so that said keyboard is exposed when said display screen in rotated to an upright position.

5. The computer system of claim 4 wherein keyboard is separable from the rest of said portable unit when said display screen is rotated to an upright position.

6. The computer system of claim 1 wherein said electrical connector on said portable unit is mounted on the rear surface of said unit and the electrical connector on said base unit is mounted on a front surface of said bight section.

7. The computer system of claim 1 wherein said portable unit also includes rechargeable energy storage means.

8. The computer system of claim 1 wherein said base unit also includes at least one additional disc drives mounted in one of the legs thereof and accessible from a side surface of said leg.

9. The computer system of claim 8 wherein said side surface of said leg includes a displaceable cover so that said additional disc drive can be selectively covered or exposed.

10. The computer system of claim 1 wherein said plurality of electrical connectors of said base unit are mounted on one of the legs of said base unit and face rearwardly, so that said electrical connectors are accessible if the rear surface of said base unit is removed.

11. A computer system comprising:
a portable computer unit comprising a housing having a substantially flat top, a front, and opposing sides, said housing having a rectangular shape when seen from the top and front, said housing containing a display screen which can fold up from a horizontal position to a vertical position, a central processor, a temporary internal storage memory, a first memory device for data storage, said first memory device being mounted in and accessible from said front side, a keyboard, and an external electrical connector for mating with a base expansion unit, and said base expansion unit having two legs interconnected by a bight portion so as to be U-shaped when seen from the top, the spacing between said legs being substantially equal to the width of said portable unit, said base unit having a mating external electrical connector for mating with said external electrical connector on said portable unit, each of said two legs of said base unit having an inner surface which faces the opposing leg and which has a step-shaped configuration which forms a ledge, said base and portable units each having common busses and being arranged so that when their electrical connectors are mated, their common busses are operatively interconnected so as to form a computer system which is expanded in relation to that of said portable unit, said base unit containing a plurality of electrical connectors for receiving a corresponding plurality of electronic expansion cards, said base unit also having a plurality of external electrical connector ports for providing electrical connections to a corresponding plurality of peripheral devices, the free end of one of said legs of said base unit containing a second data memory device, said second memory device being accessible from the axial end of said one leg, said base and said portable units containing mechanical mating means for maintaining said units at a substantially common height level when said portable unit is placed between the legs of said base unit on the ledge of the step on the inner surfaces of said legs and the mating connectors of said units are mated.

12. The computer system of claim 11 wherein said ledge on each of said legs of said base unit faces up and is parallel to the top surface of said base unit, the spacing between said ledge and the top of said base unit being equal to the height of said portable unit, such that when said portable unit is placed upon said ledge, the top surfaces of said portable and base units are coplanar.

13. The computer system of claim 11 wherein said keyboard of said portable unit is mounted under said display screen so that said keyboard is exposed when said display screen in rotated to an upright position.

14. The computer system of claim 13 wherein keyboard is separable from the rest of said portable unit when said display screen is rotated to an upright position.

15. The computer system of claim 11 wherein said electrical connector on said portable unit is mounted on the rear surface of said unit and the electrical connector on said base unit is mounted on a front surface of said bight section.

16. The computer system of claim 11 wherein said portable unit also includes rechargeable energy storage means.

17. The computer system of claim 11 wherein said base unit also includes at least one additional disc drives mounted in one of the legs thereof and accessible from a side surface of said leg.

18. The computer system of claim 17 wherein said side surface of said leg includes a displaceable cover so that said additional disc drive can be selectively covered or exposed.

19. The computer system of claim 11 wherein said plurality of electrical connectors of said base unit are mounted on one of the legs of said base unit and face rearwardly, so that said electrical connectors are accessible if the rear surface of said base unit is removed.

20. A computer system comprising:
a portable computer unit comprising a housing having a substantially flat top, a front, and opposing sides, said housing having a rectangular shape when seen from the top and front, said housing containing a display screen which can fold up from a horizontal position to a vertical position, a central processor, a temporary internal storage memory, a first memory device for data storage, said first memory device being mounted in and accessible from said front side, a keyboard, and an external electrical connector for mating with a base expansion unit, and said base expansion unit having two legs interconnected by a bight portion so as to be U-shaped when seen from the top, the spacing between said legs being substantially equal to the width of said portable unit, said base unit having a mating external electrical connector for mating with said external electrical connector on said portable unit, each of said two legs of said base unit having an inner surface which faces the opposing leg and which has a step-shaped configuration which forms a ledge, said ledge facing upward and being parallel to the top of said base unit, the spacing between said ledge and the top of said base unit being equal to the height of said portable unit so that when said portable unit is mounted on said ledge, its top and the top of said base unit are coplanar, said base and portable units each having common busses and being arranged so that when their electrical connectors are mated, their common busses are operatively interconnected so as to form a computer system which is expanded in relation to that of said portable unit, said base unit containing a plurality of electrical connectors for receiving a corresponding plurality of electronic expansion cards, said base unit also having a plurality of external electrical connector ports for providing electrical connections to a corresponding plurality of peripheral devices, the free end of one of said legs of said base unit containing a second data memory device, said second memory device being accessible from the axial end of said one leg.

* * * * *

UNITED STATES PATENT AND TRADEMARK OFFICE
CERTIFICATE OF CORRECTION

PATENT NO. : 4,769,764
DATED : 1988 Sep 6
INVENTOR(S) : Levanon, Isaac

It is certified that error appears in the above-identified patent and that said Letters Patent are hereby corrected as shown below:

Col. 3, line 47: after "by a" insert --handle--.

Claims 1, 11, and 20, line 13: delete "and".

Claims 8 and 17, line 2: change "drives" to --drive--.

Signed and Sealed this

Seventh Day of March, 1989

Attest:

DONALD J. QUIGG

*Attesting Officer*     *Commissioner of Patents and Trademarks*